United States Patent [19]
Urban

[11] 3,713,253
[45] Jan. 30, 1973

[54] TREATMENT OF SOIL

[76] Inventor: Urban A. Urban, Rte. 1, Box 163A, Menasha, Wis. 54952

[22] Filed: Jan. 24, 1972

[21] Appl. No.: 220,298

Related U.S. Application Data

[63] Continuation-in-part of Ser. No. 879,569, Nov. 24, 1969, abandoned.

[52] U.S. Cl. ............... 47/58, 47/DIG. 10, 47/DIG. 7
[51] Int. Cl. .............................................. A01b 79/00
[58] Field of Search .......... 47/9, 58, DIG. 7, DIG. 10; 71/1, 64

[56] References Cited

UNITED STATES PATENTS

| | | | |
|---|---|---|---|
| 2,625,471 | 1/1953 | Mowry et al. | 71/1 |
| 2,951,753 | 9/1960 | Groves | 71/1 |
| 3,003,911 | 10/1961 | Lindstrom et al. | 71/64 X |
| 3,233,365 | 2/1966 | Bergann | 47/34 X |
| 3,274,731 | 9/1966 | Vigneault | 47/9 |
| 3,372,019 | 3/1968 | Fox | 71/64 |
| 3,418,151 | 12/1968 | Otrhalek et al. | 47/58 X |

*Primary Examiner*—Robert E. Bagwill
*Attorney*—James J. Hill

[57] ABSTRACT

Soil is treated prior to planting by spreading water-insoluble, polyolefin pellets having an average cross sectional dimension in the range of 1/16 in. to 3/16 in. and having an average density in the range of 30 pounds per cubic foot to 37.5 pounds per cubic foot over the surface of the soil. The amount of particulate material applied ranges from 0.010 pounds to 0.035 pounds per square foot of soil surface area, as indicated by type of soil and degree of compaction. The soil is then worked so that the polyolefin particles are distributed uniformly within the soil to a depth in the order to about 6 to 8 inches below the surface. The method promotes seed germination, allows faster plant growth, provides more efficient use of moisture and nutrients, reduces erosion and crustation, and thus improves crop yields.

3 Claims, No Drawings

TREATMENT OF SOIL

RELATED APPLICATION

This is a continuation-in-part application of my copending application, Ser. No. 879,569, for improvements in "Treatment of Soil," filed Nov. 24, 1969, and now abandoned.

BACKGROUND AND SUMMARY

The present invention relates to the treatment of soil, and it contemplates the addition of particular material in carrying out this soil treatment.

There are a number of problems associated with the cultivation of soil. For example, due to water and wind erosion extensive areas of the earth have been lost as cultivatable land. Methods have been derived to minimize wind and water erosion by stabilizing the soil surface, for example, by adding an aqueous dispersion of a water-soluble polyvinyl compound to form a water-insoluble resilient crust for binding the soil particles together at the surface. Such specifically directed remedies may, however, contribute to or aggravate other soil deficiencies, for example, soil crusting.

Crusting of soil has been sought to be controlled in a number of ways such as overseeding, irrigation, mechanical means such as rolling equipment, chemical additives, and treating the soil with an aqueous emulsion of a particular kind of synthetic hydrocarbon polymer.

The present invention, as distinguished from prior attempts to alleviate particular problems associated with a given soil contemplates the conditioning of soil which promotes better seed germination, allows faster plant growth, minimizes crustation, yet reduces erosion and maintains control of soil moisture levels. At the same time, the conditioning treatment of the present invention is of long duration, so that once it is applied, the soil continues to exhibit these improved characteristics for an extended period of time--of the order of 8 to 10 years under normal re-tilling conditions, before some additional treatment is required.

The inventive method of soil treatment takes place prior to planting, and it includes spreading water-insoluble polyolefin particles having an average cross sectional dimension in the range of 1/16 in. to 3/16 in. and having an average density in the range of 30 pounds per cubic foot to 37.5 pounds per cubic foot, depending upon the soil and the desired characteristics after treatment. The treating material is spread over the surface of the soil at the rate of about 0.010 pounds to 0.035 pounds of pellets per square foot of soil surface area, depending upon the intended use of the soil and soil characteristics. The soil is then worked so that the polyolefin particles are equally distributed throughout the top soil to a depth in the order of about 6 to 8 in. below the surface.

In addition to the above advantages of the present treatment, it has been found to provide more efficient plant use of the moisture and available nutrients to thereby improve crop yields, and through its use, marginal or unusable soils have been converted to efficient agricultural use. Other features and advantages of the present invention will be apparent to persons skilled in the art from the following field test data and detailed description.

In the practice of the present invention, a solid resin, preferably of polyolefin base, and in the form of pellets is spread over the surface of the soil to be treated. In the preparation of the materials, larger bodies may be ground through any standard blade type chopper and then screened through a mesh of the desirable size. The resultant material is then blown into bags or other containers for shipment.

Polyolefin material of any particular type may be used, such as scrap, reject film, offgrade or cull resin either transparent or opaque. Further, nylon, Mylar or acetate derivative or any combination of these basic solid rigid plastic materials may be employed in the practice of the invention. As used herein, the broad designation polyolefin will be used to include all such equivalent material. The pellets are water insoluble.

The preferred forms of the pellets include cubes and cylindrical forms because of the ease of producing these shapes. It has been found that for the larger size pellets (approximately ⅛ in. by ⅛ in.) cubes and cylindrical shapes are more advantageous; and these may be formed through conventional melt and extruding processes. The pelletized material may be produced by extrusion or compaction of basic resins or resin mixes into small pellets through a strand type die of appropriate diameter. The strand may then be fed through a standard pelletizer to cut the individual strands at a predetermined length, or the strands may be fed through material compaction devices such as the California pellet ace, as is commercially available.

Whether the pellet is in the form of particles, cubes, cylinders, etc., the important physical parameter is the longest dimension of the particles taken parallel to a surface; and this dimension is referred to as the "cross sectional dimension" of the particle. In terms of the particular material used, this dimension is given as an average, and it may range from 1/16 in. to 3/16 in. depending upon the type of soil to which it is applied and the characteristics desired, as will be more fully explained within.

The polyolefin material is spread (the means, again, depending upon the application) over the surface of the soil to be treated and the soil is then worked or tilled to distribute the particles evenly throughout the top soil to a depth of about 6 to 8 in. The treatment has advantages in all of the commonly found types of soil. For example, in heavy clay soils and hard pan, it reduces the degree of compaction and thus provides aeration, greater moisture absorption and greater moisture retention. It also permits seed sprouts to penetrate the soil crust for faster and more efficient germination and initial growth. In black loam soils the pellets of polyolefin material serve as a dimensionally stable inert foreign substance which does not change physical dimension and absorption characteristics as does the soil itself thereby permitting the soil to retain moisture from heavy dew and rains. That is, the moisture once it penetrates the soil is inhibited against migration to the surface where it would evaporate. In sandy soils the pellets or polyolefin material also control the evaporation of moisture by inhibiting migration to the surface. The pellets are insoluble in water or any combination of soil acids. They therefore maintain their density, shape and resiliency and continue to dominate the moisture attraction and retention, and compactness of the soil surrounding each pellet. Since these pellets do not deteriorate or become a part of the soil they attract air and soil moisture to them thus creating reservoirs of moisture of nutrients for plant roots. As plant root hairs seek out and find these pockets, their growth is stimulated to a noticeable degree over plants from untreated soils.

EXAMPLE I

Polyolefin material, when mixed with soil in flower pots, greenhouses, gardens and farm fields in amounts proportional to the desired characteristics and pretreatment nature of the soil, develops a porous condition needed to stimulate plant growth. In heavy clay soils, for example, an application of up to 1,500 pounds per acre is suggested. Since the pellets are chemically inert and have almost no contraction and expansion with different conditions of moisture, temperature, etc., they remain in their original form indefinitely and thus provide soil porosity for years after the initial application and working into the soil. The porosity, of course, fosters plant growth by increasing the moisture absorption and retention characteristics of the soil and by minimizing soil crustation. Seed sprouts are permitted to penetrate the soil for better and faster germination after planting, and heavy crustation as is common in thick clay soils is prevented. The polyolefin material has an average density in the range of 30 pounds per cubic foot to 37.5 pounds per cubic foot for the pellets.

EXAMPLE II

When the pellets remain in the soil for extended periods of time they are continuously cultivating or kneading the tiny volumes of neighboring soil as the weather conditions and moisture concentration vary from time to time, thus continuously working on a very small scale that soil in the immediate neighborhood of each particle. This continuous working by the polyolefin particles not only prevents crustation of the soil but, upon the soil's drying out, forms tiny pockets for future absorption and retention of moisture when it occurs, even taking advantage of the moisture in heavy dews.

If the polyolefin material is spread by hand, it is preferably spread so as to cover approximately ¼ of the exposed surface of the soil by visual inspection. This is equal to an application of about 0.03 pounds per square foot of exposed surface area. The material may then be worked into the soil with a hoe or rake (or other hand tool) to a depth of 6 to 8 inches thus providing a combined mixture of the material of approximately 0.01 pounds per cubic foot of top soil.

In areas of medium size such as lawns or large gardens, the material may be applied by a standard lawn spreader set at a setting of 12 to provide a coverage of 0.03 pounds per square foot. When this material is worked into the soil to a depth of 6 to 8 inches with a rotor tiller, for example, it provides about 0.01 pounds of polyolefin material per cubic foot of top soil.

In agriculture use, the normal application for top soil treatment may be accomplished with the standard fertilizer spreader at a setting of six to eight; (application being dependent upon soil condition and desired use) and this will result in the application of 500–600 pounds of polyolefin material per acre, or 0.014 pounds per square foot of surface. When the material is worked in the soil by harrow or disk to a depth of 6 to 8 inches, the resultant mixture will contain approximately 0.005 pounds of polyolefin material per cubic foot.

For sub-soil treatment, the initial treatment is the same as for top soil with the application of about 1,200 pounds of polyolefin material per acre, and after the initial working, by harrow or disk, the soil is deep-plowed to a depth of 14 in. to get adequate sub-soil penetration and provide 0.01 pounds of polyolefin material per cubic foot of soil.

As can be seen from the table captioned "Field Test Data," the use of the invention has significantly enhanced crop yield. These results are for crops in the years 1970 and 1971. In the tests, applications of various rates of pellets were used in contiguous plots on fields in Central Wisconsin. Test field soil conditions ranged from heavy clay to a clay loam mixture. Test plots were located immediately adjacent to control or untreated plots of equal size. Typical results were:

Plants in treated areas had better germination records (more plant count) than untreated control areas.

Plants in treated areas were 25–30 percent taller.

Plants in treated areas had 20–30 percent larger root systems.

Grain (corn cobs and wheat and oat heads) were 30 percent larger on plants from treated areas.

Summarizing the advantages of the inventive soil treatment method, it affords a method of controlling the moisture level of the soil by reducing surface evaporation, while, at the same time, preventing crustation of the surface soil and reducing the effects of wind and rain erosion. Further, it has been found to promote seed germination and enhance faster plant growth and improve crop yields. The polyolefin material does not deteriorate or decompose in the soil. It retains its resiliency and density and is insoluble in water or soil moisture or acid and thus does not bind with the soil (as rocks, grains or sand, compacted fibers, or other materials which will eventually decompose) throughout the lifetime of the pellet. This feature of the polyolefin pellets is believed to provide a constant tilling action in the soil to allow each pellet to influence the moisture and plant nutrient qualities of the soil surrounding it. It will continue to provide all of its advantages for 8 to 10 years after application.

FIELD TEST DATA

| | Plt. Count | Yield/Acre |
|---|---|---|
| 1970 (wet early growing season) Wheat fields — 10 acres | | |
| Untreated "control" plots | 1,481,000 | 27.8 bu. |
| Treated with 800 lb/acre polyolefin | 2,047,320 | 30.5 bu. |
| Treated with 1000 lb/acre polyolefin | 2,395,200 | 33.6 bu. |
| Corn fields — 20 acres — 36-inch row planting | | |
| Untreated "control" plots | 16,080 | 54.1 bu. |
| Treated with 500 lb/acre polyolefin | 21,024 | 65.6 bu. |
| Treated with 800 lb/acre polyolefin | 22,608 | 78.4 bu. |
| Treated with 1000 lb/acre polyolefin | 23,470 | 75.8 bu. |
| Treated with 1500 lb/acre polyolefin | 25,498 | 74.2 bu. |
| 1971 (dry early growing season) Oats fields — 10 acres | | |

| | | |
|---|---|---|
| Untreated control plots | 1,591,000 | 31.5 bu. |
| Treated with 1000 lb/acre polyolefin | 1,892,000 | 41.0 bu. |
| Treated with 1300 lb/acre polyolefin | 1,634,000 | 42.0 bu. |
| Corn fields — 20 acres — 36-inch row planting | | |
| Untreated control plots | 17,937 | 75.8 bu. |
| Treated with 1000 lb/acre | 21,525 | 117.6 bu. |
| Treated with 1500 lb/acre | 23,103 | 143.5 bu. |

Summary of test periods

Wheat 1970 — 10–20% increased yield on treated soil

Corn 1970 — 20–45% increased yield on treated soil

Oats 1971 — 30–31% increased yield on treated soil

Corn 1971 — 55–89% increased yield on treated soil

Having thus described in detail preferred embodiments of my method for treating soil, persons skilled in the art will be able to substitute various materials for those which have been disclosed and to modify the shape and size of the pellets while continuing to practice the inventive principles; and it is, therefore, intended that all such modifications and substitutions be covered as they are embraced within the spirit and scope of the invention.

I claim:

1. A method of soil treatment prior to planting comprising spreading discrete, pellets of water-insoluble polyolefin material having an average cross sectional dimension in the range of 1/16 in. to 3/16 in. and having an average density in the range of 30 pounds per cubic foot to 37.5 pounds per cubic foot over the surface of the soil to be treated at the range of about 0.010 pounds to 0.035 pounds per square foot of soil surface area, then working the polyolefin pellets into the soil to a depth in the order of about 6 to 8 inches below the surface to evenly distribute the particles throughout the top soil.

2. The method of claim 1 wherein said pellets have an average volume of about 0.002 cubic in. and wherein said pellets are spread over the surface of the soil to be treated at about 0.030 pounds of polyolefin material per square foot of soil surface.

3. The method of claim 1 further comprising the step of deep plowing the soil after said step of working to distribute the polyolefin material equally to a depth of about 14 in. below the surface of the soil.

* * * * *